United States Patent [19]
Kimura et al.

[11] Patent Number: 5,125,041
[45] Date of Patent: Jun. 23, 1992

[54] STILL IMAGE PROCESSING METHOD FOR BLURRING AN IMAGE BACKGROUND AND PRODUCING A VISUAL FLOWING EFFECT

[75] Inventors: Hiroyuki Kimura; Koji Takahashi, both of Yokohama; Kazunobu Urushihara, Inagi; Susumu Matsumura, Yokohama; Makoto Katsuma; Hiroshi Ohmura, both of Wako, all of Japan

[73] Assignee: Canon Kabushiki Kaisha, Tokyo, Japan

[21] Appl. No.: 489,738

[22] Filed: Feb. 28, 1990

Related U.S. Application Data

[63] Continuation of Ser. No. 307,134, Feb. 6, 1989, abandoned, which is a continuation of Ser. No. 891,377, Jul. 31, 1986, abandoned.

[30] Foreign Application Priority Data

Aug. 5, 1985 [JP] Japan .................................. 60-172010

[51] Int. Cl.$^5$ .......................... G06K 9/40; H04N 9/74; G03B 21/32; G03B 15/00
[52] U.S. Cl. ........................................ 382/44; 358/22; 352/85; 354/291; 354/123
[58] Field of Search ...................... 382/44; 352/39, 45, 352/84, 85, 29, 291; 354/110, 120, 122, 123; 364/518; 358/22

[56] References Cited

U.S. PATENT DOCUMENTS

| | | | |
|---|---|---|---|
| 3,902,798 | 9/1975 | Trumbull et al. | 352/85 |
| 4,319,268 | 3/1982 | Yamada | 358/75 |
| 4,393,394 | 7/1983 | McCoy | 352/22 |
| 4,602,286 | 7/1986 | Keller et al. | 358/22 |
| 4,642,676 | 2/1987 | Weinger | 358/22 |
| 4,681,415 | 7/1987 | Beer et al. | 354/120 |
| 4,698,682 | 10/1987 | Astle | 358/22 |

Primary Examiner—Leo H. Boudreau
Assistant Examiner—Michael Cammarata
Attorney, Agent, or Firm—Fitzpatrick, Cella, Harper & Scinto

[57] ABSTRACT

A still image processing method which can execute the effective flowing process is provided. In this method, when the flowing process is executed by shifting some or all of the pixels constituting a still image of one image plane in a predetermined direction, if no image information to be shifted exists at the first image position, the image information from elsewhere in the image plane is shifted to the second image position. The image information at the second image position is obtained by shifting the image information in the image plane in the direction opposite to the principal shifting direction.

15 Claims, 6 Drawing Sheets

STILL IMAGE PROCESSING METHOD FOR BLURRING AN IMAGE BACKGROUND AND PRODUCING A VISUAL FLOWING EFFECT

This application is a continuation of application Ser. No. 307,134 filed Feb. 6, 1989, now abandoned, which is a continuation of application Ser. No. 891,377 filed Jul. 31, 1986, now abandoned.

FIELD OF THE INVENTION

The present invention relates to a still image processing method whereby flowing processing is executed by shifting a part of all of a still image of one image plane in a predetermined direction.

DESCRIPTION OF THE RELATED ART

Photography employing flowing, zooming during exposure, or the like has been known as a method of optically effecting flowing at the time the photograph is made. In the flowing photographing method, a moving object (vehicle, person, bicycle, etc.) is stopped by photographing the object in accordance with the motion thereof by slowing the shutter speed, and a sense of high speed is obtained by moving the background. On the other hand, in zooming during exposure, the focal distance of the zoom lens is changed during the exposure as a result of which, the object at the center of the image plane is emphasized, and the image around the image plane is allowed to flow in a radial direction.

Such photographical methods require advanced techniques.

Therefore, it can considered to obtain the effect of the flowing process by performing an electrical image process on an image having no flowing background or the like, upon photographing.

However, for example, such flowing photographing has the following problems.

Figure 2:
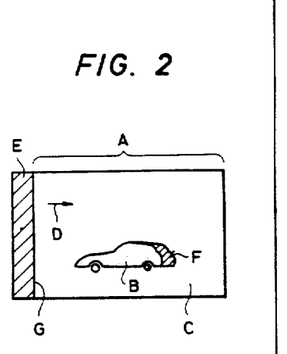
FIG. 2 is an explanatory diagram of the flowing photographing process.

In FIG. 2, reference character A denotes an original still image; B is a still object, in this case, a vehicle; C is a background area which is to be subjected to the flowing process; and D is a vector arrow indicative of the direction and amount of the flowing process.

In the case of executing the flowing process, each image of the background area of the original image is shifted in the direction indicated by the arrow D; however, since the original image does not extend as far to the left as area E, each image cannot be shifted into the area C.

On the other hand, no original image information exists in area F after the shift, since that area becomes the shadow of the vehicle, so that it is impossible to shift.

Thus, there is the problem that an effective flowing process effect cannot be obtained.

SUMMARY OF THE INVENTION

The present invention intends to solve the abovementioned problems and to provide a still image processing method which can execute an effective flowing process.

According to one aspect of the present invention, if no image information to be shifted into a background area C exists at a first image position in an image plane, original image information from another position in the image plane is shifted to the first image position.

The above and other objects and features of the present invention will become apparent from the following detailed description and the appended claims with reference to the accompanying drawings.

DESCRIPTION OF THE PREFERRED EMBODIMENTS

Figure 1:
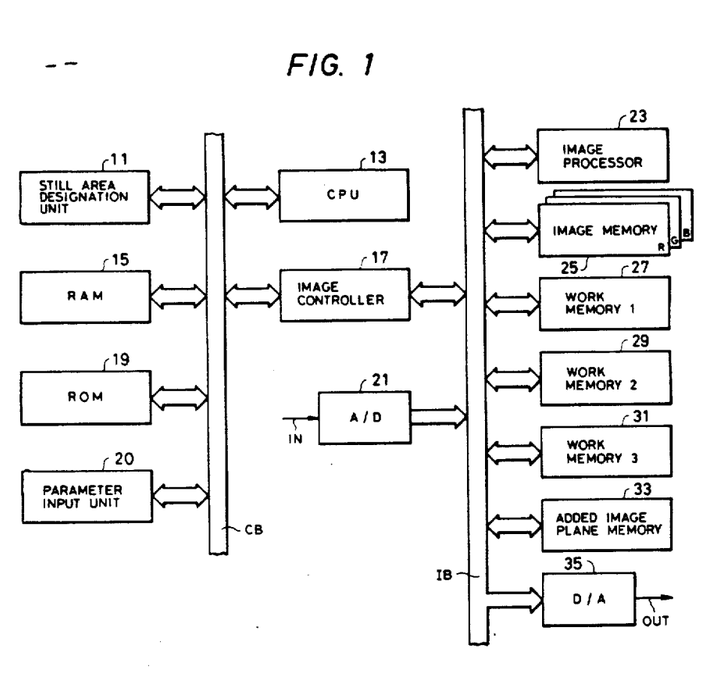
FIG. 1 is a control block diagram of an image processing apparatus of the first embodiment according to the present invention.

FIG. 1 shows a control block diagram of an embodiment of the present invention.

In the diagram, a still area designation unit 11 to designate the area B, namely, the still area in FIG. 2, is constituted by a mouse or the like. A CPU 13 executes the whole control. A RAM 15 temporarily stores the data necessary for the processes by the CPU 13. An image controller 17 functions as an interface between a computer bus CB and an image bus IB. A ROM 19 stores the control programs to be executed by the CPU 13. A parameter input unit 20 inputs the parameters of direction and distance in the flowing process. An A/D converter 21 converts an analog input still image signal IN to a digital value. An image processor 23 executes the image processes. An image memory 25 divides the input still image signal into respective R, G, and B image planes and stores it. Work memories 27, 29, and 31 are provided for the image processes. An added image plane memory 33 stores the results of calculations. A D/A converter 35 converts the processed digital image to an analog signal and outputs it.

Figure 3:
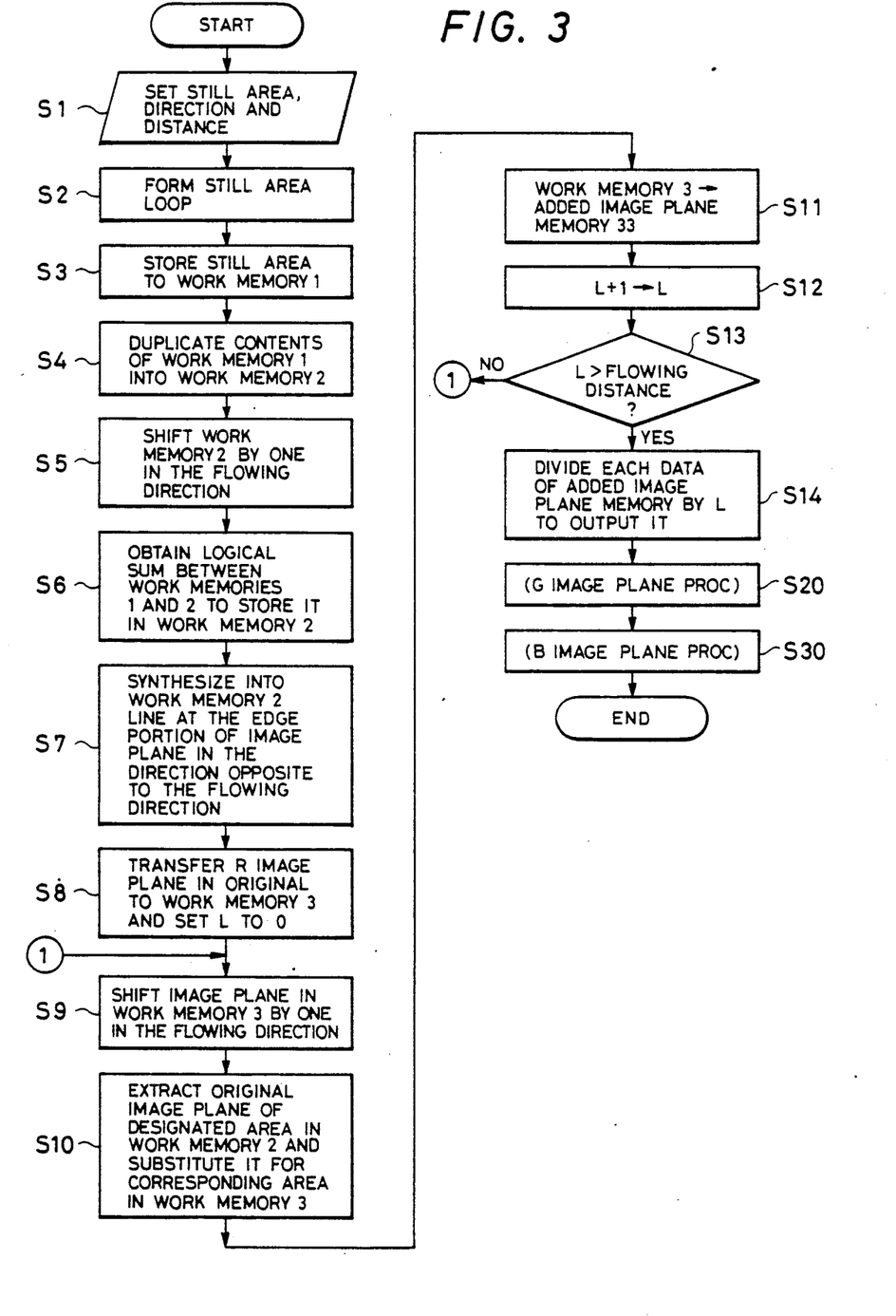
FIG. 3 is a control flowchart of the first embodiment of the flowing photographing process.

FIG. 3 shows a processing program to obtain the flowing photographing effect in the case of using the image processing apparatus constituted as mentioned above.

An explanation will now be made hereinbelow with reference to FIG. 3.

In step Si, the operator first designates a still area (B in FIG. 2) by means of the designation unit 11 and also designates flowing direction and distance by means of the parameter input unit 20. The still area is designated by surrounding this area with a line.

Since the loop designated to define the area may have been unintentionally cut, the still area is processed to define a closed loop, by executing a diffusing and fining process and similar processing on the loop line such that the still area is surrounded by a closed loop (S2). A bit map indicative of the still area surrounded by the closed loop is store in a work memory 1 (27 in FIG. 1) (S3).

Next, the contents of the work memory 1 are duplicated into a work memory 2 (S4) and the contents of the work memory 2 are further shifted by a distance of one unit in the flowing direction (S5).

Then, the bit maps of the work memories 1 and 2 are combined by means of a logical OR operation and the result is stored in the work memory 2 (S6).

Further, the first bit in the work memory 2 corresponding to the line (G in FIG. 2) of the edge portion of the image plane in the direction opposite to the flowing direction is set (S7).

As a result of the above operations, the still area, the area which is obtained by shifting the still area by the distance of one unit, and the bit map indicative of the edge portion of the image plane in the direction opposite to the flowing direction, are formed in the work memory 2.

Next, the whole R image plane in the original image is transferred to a work memory 3 and a parameter L, representative of the shift amount, is set to "1" (S8). The image plane of the work memory 3 is shifted by the distance of one unit in the flowing direction and stored in the work memory 3 again (S9).

The contents of the work memory 3 in which the image has been shifted by a distance of one unit are added into the added image plane memory 33. Then, the image which has been further shifted by the distance of one unit is stored in the work memory 3, and thereafter, the contents of work memory 3 are again added into the added image plane memory 33. However, if they are simply added, the area to be kept still has also be made to flow. Therefore, it is necessary to return the still area, only, to the original image position. The portion (F in FIG. 2) shifted from the rear end portion of the still area is not the image of the background (C in FIG. 2). On the other hand, no image exists at the position (E in FIG. 2) of the original image which will flow with respect to the edge portion in the direction opposite to the flowing direction.

Therefore, the data in work memory 2 made in steps S1 to S7 is used. Namely, in step S10, in the original image (R image plane: stored in the image memory 25) the image of the area designated in the work memory 2 is extracted and stored at the corresponding area in the work memory 3 and stored in the work memory 3. Thus, the image in the still area in the work memory 3 is returned to the original image position. In addition, the image shifted from the still area to the background area F is also replaced by the background information at the original position. The image shifted from the edge portion E of the image plane is also replaced by the background information at the original position.

The image in the work memory 3 derived by means of the above operations is added into the memory 33 (S11). Since the shifting procedure has been finished once, the value of L is increased by "1" (S12) and the operations in steps S9 to S18 are repeated until the value of L becomes the desired flowing distance (S13).

The added image plane memory 33 needs a memory capacity including bits whose number is equal to or larger than $B_{max} \times L_{max}$ ($B_{max}$ = maximum gradation number of units, and $L_{max}$ = maximum flowing distance), so as not to cause an overflow even if the above-described adding operations are performed a number of times which corresponds to the maximum flowing distance.

After completion of the image plane shifting operations in correspondence to the flowing distance, the value of each dot of the memory 33 is divided by only the flowing distance L to thereby obtain the average concentration concerned with each dot (S14). In this manner, the flowing process regarding the R image plane is completed.

Subsequently, with respect to the G and B image planes as well, the contents of the work memory 3 and added image plane memory 33 are reset and the operations in steps S8 to S14 are repeated in a manner similar to the above. Thus, the final image made in accordance with flowing photography can be completed (S20, S30).

Figure 7:
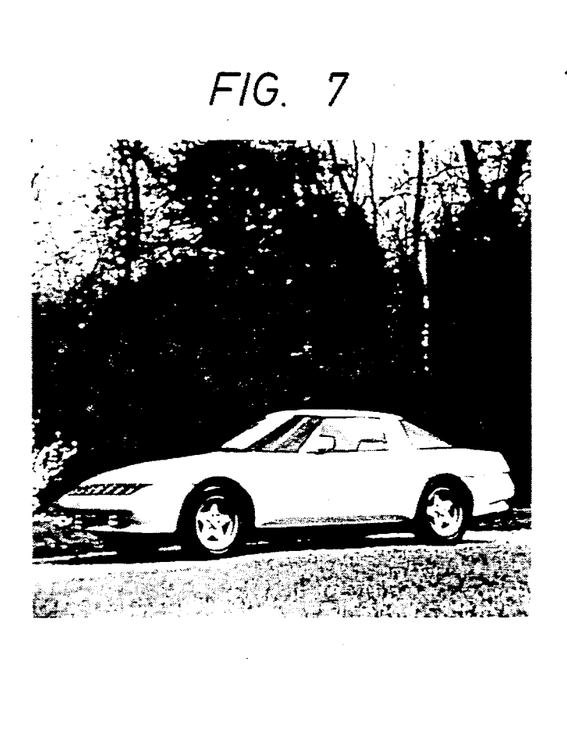
FIG. 7 is a photograph of an original image.
Figure 8:
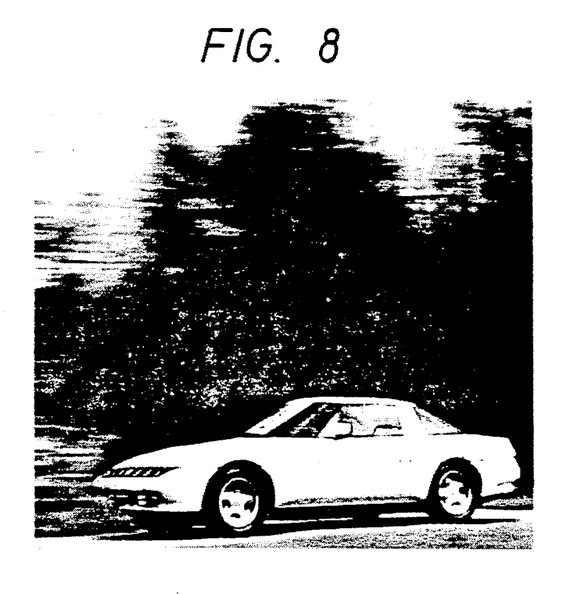
FIG. 8 is a photograph of an image after completion of the flowing photographing process according to the first embodiment of the present invention.

The image after completion of the flowing photographic process derived as described above and the original image ar attached as reference photographs in FIGS. 8 and 7, respectively.

Although the flowing direction has been set to a direction which is parallel with one edge of the image in this embodiment, it may be also set to an oblique direction. In this case, the edge portions of the image plane in the direction opposite to the flowing direction exist at two positions; however, processing similar to the above can be executed.

The second embodiment of the present invention will now be described.

The second embodiment has the feature that, in order to obtain image information in an area (like area E or area F in FIG. 2) where no image information is provided by the shifting of the non-still portion(s) of the images, image information is shifted into such areas (E and F) from other non-still portions of the image.

Figure 4:
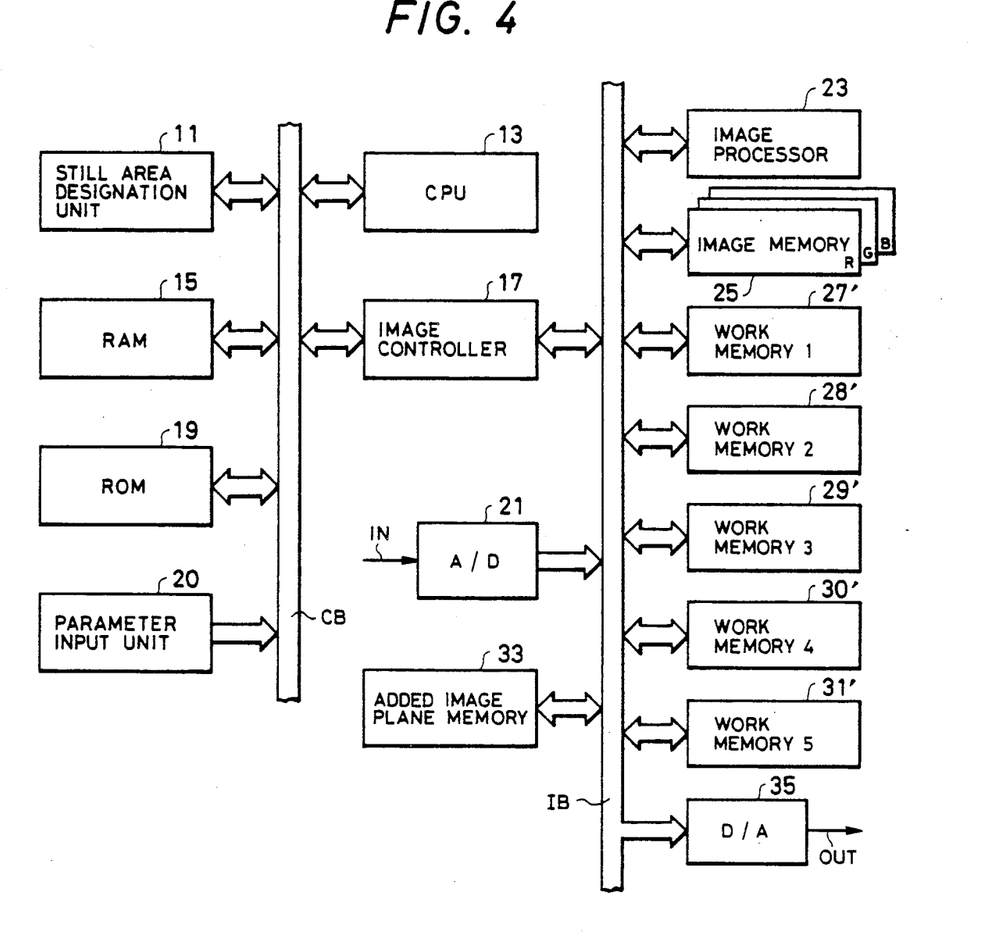
FIG. 4 is a control block diagram of an image processing apparatus of the second embodiment.

FIG. 4 shows a control block diagram of the second preferred embodiment of the invention. In FIG. 4, the parts and components having the functions similar to those of the parts and components shown in FIG. 1 are designated by the same reference numerals.

Numerals 27', 28', 29', 30' and 31' denote work memories for the image processes.

Figure 6A:
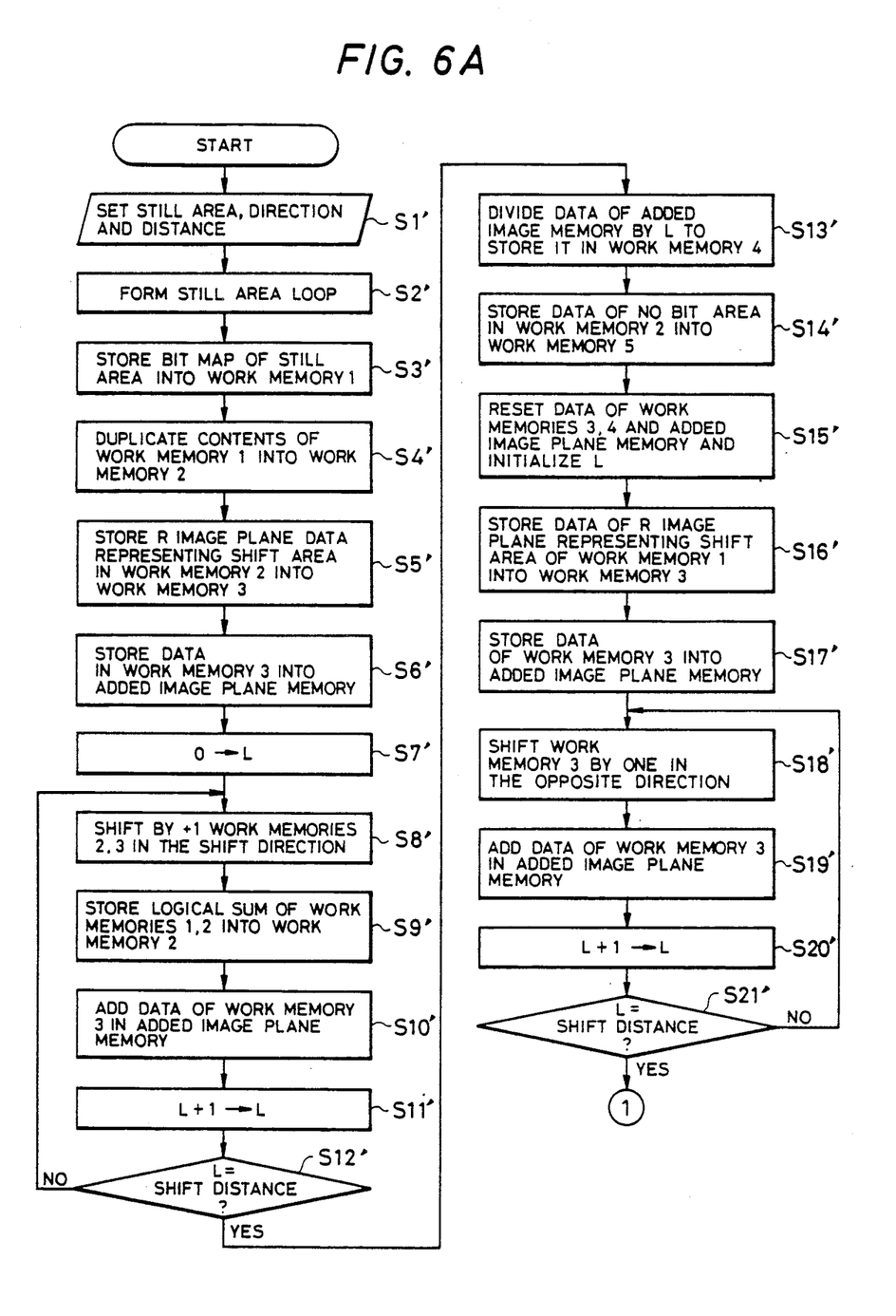
FIGS. 6A and 6B are diagrams showing a control flowchart of the second embodiment of the flowing photographing process.
Figure 6B:
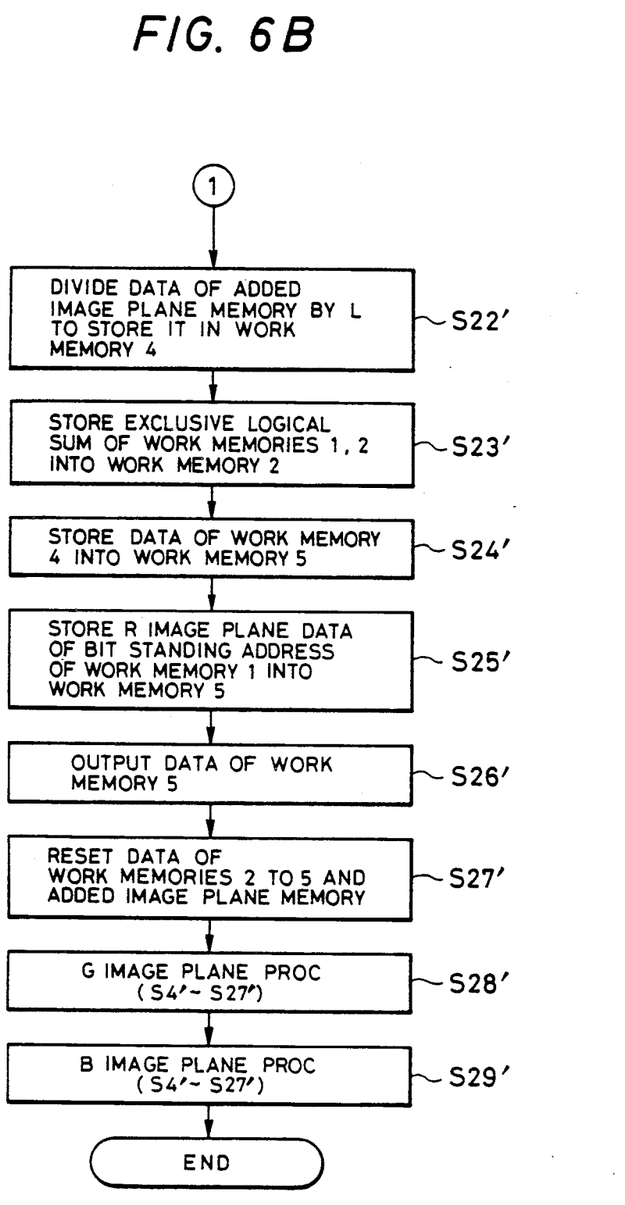

FIG. 6 shows the processing program which can be used to obtain the flowing photographic effect in the case of using the image processing apparatus having such a construction as mentioned above.

An explanation will be provided herein below with reference to FIG. 6.

In step S1', the operator first designates a still area ($B_2$ in FIG. 5) by means of the designation unit 11 and designates flowing direction and distance by means of the parameter input unit 20. The still area is designated by surrounding this area with a line.

Next, since it is possible that the loop designated to determine the area may have been unintentionally cut, the still area is processed by means of diffusing and fining processes and the like of the loop line such that the still area is surrounded by a closed loop (S2'). The bit map of which bit 1 was set in the still area surrounded by the closed loop and in the outermost frame of the image plane is stored in the work memory (1) (27 in FIG. 4) (S3'). In this case, if bit 1 is set at the edge portion of the still area, the edge portion corresponding to one line becomes 0 when an exclusive—OR operation is later performed with respect to this edge portion.

The contents of the work memory (1) are then duplicated into the work memory (2) (S4'), and bit I is set at the edge portion of the image plane in the direction opposite to the flowing direction.

The data in area ($C_2$ in FIG. 5) corresponding to the shift area of the work memory (2), namely, the data of the R image plane (in the image memory 25) in the address of the area where no bit is set in the bit map is stored in the work memory (3) (S5').

The data in the work memory (3) is stored in the added image plane memory 33 (S6').

The value of L indicative of the shifted distance is initialized to "0" in step S7'.

The data of the work memory (3) is sequentially shifted and added into the added image plane memory (S8', S10', S11', S12') until the distance L reaches the amount set in step S1'.

At the same time, the data of the work memory (2) is shifted, a logical OR operation is performed between the shifted data and the data of the work memory (I) and the result stored in the work memory (2) again, and these processes are repeated until the shift distance L becomes the amount which has been set in step S1' (S8', S9', S11', and S12'). Thus, the bit map of which bit "1" was set into areas B2, E'2, and F2 in FIG. 5 is formed in the work memory (2).

The average value of the concentration levels obtained by the shift is calculated by dividing the data of the added image plane memory by the shift amount L and stored in the work memory (4) in step S13'.

Figure 5:
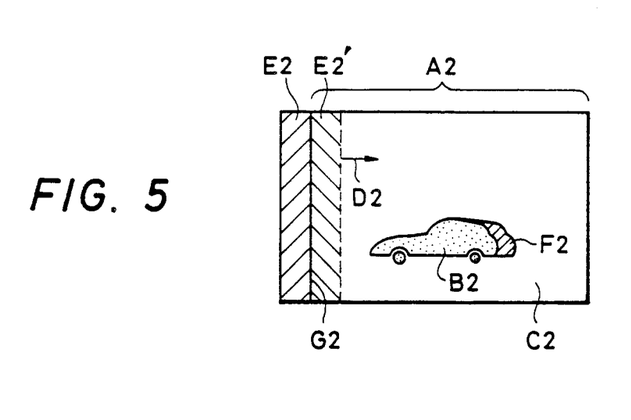
FIG. 5 is an explanatory diagram of the flowing photographing process.

In step S14', the data of the work memory (4) in the address in the area of the work memory (2) where bit "1" is not set, namely, in the area which is derived by removing the areas B2, E'2, and F2 from the original image data A2 in FIG. 5 is stored in the work memory (5) of the same address.

In the next step S15', the data of the work memories (3) and (4) and of the added image plane memory are reset and the value of L is further initialized to "0" and thereafter the next processes are executed.

In steps S16' to S24', the data of the areas E'2 and F2 is derived in the areas which could not be obtained until step S14'. Since no information which will flow exists in the areas E'2 and F2 as mentioned above, the data of the direction opposite to the shifting direction in this embodiment. First, the data of the R image plane (in the image memory 25) corresponding to the shift area of the work memory (1) is stored in the work memory (3) in step S16'.

The data of the work memory (3) is added into the added image plane memory.

In the manner similar to steps S8', S10', S11', and S12', the image is merely shifted in the direction opposite to the shifting direction and the data is added into the added image plane memory (S18' to S21').

The data shifted and added into the added image plane memory is divided into the shift distance L and the resultant data is stored in the work memory (4) (S22').

The average value of the concentration levels by the image shift in the opposite direction can be derived by this operation.

In step S23', a logical exclusive OR operation is performed between the data in the work memories (1) (which was obtained in step S3') and (2) (which was obtained in step S9') and the result of this operation is substituted for the data in the work memory (2). Bit "1" is set in the area B2 in FIG. 5 in the work memory (1) and bit "1" is also set in the area B2, E'2, and F2 in the work memory (2) before replacement. Therefore, bit "1" is set in the addresses in the areas E'2 and F2 in the work memory (2) after the replacement.

In the next step S24', the data of the work memory (4) of the address in the work memory (2) where bit "1" is set is stored in the work memory (5) of the same address as above.

In this manner, the data of which the area excluding the area B, namely, the background area C, was shifted is stored in the work memory (5).

Subsequently, the data of the R image plane (stored in the image memory) in the address int eh work memory (1) where bit "1" is set, that is, in the address of the still area is stored in the work memory (5) of the same address as above (S25').

Thus, the image of which the background area was shifted with the still area unchanged is all stored in the work memory (5).

The data of the work memory (5) is output in step S26'. The data of the work memories (2) to (5) and of the added image plane memory are reset in step S27' to subsequently execute the image processes of the G and B image planes in steps S28' and S29'. The processes similar to those in steps S4' and S27' are executed with respect to the G and B image planes of the image memory in steps S28' and S29', then the processes will be finished.

When the number of bits of the pixel data stored in the image memory 25 is eight, a memory capacity of eight bits will be needed for each address in the work memories (3), (4), and (5). Since the work memories (1) and (2) function as bit maps, it is sufficient to provide one bit for each address. On the contrary, the added image plane memory needs a sufficiently large capacity so as not to cause any overflow even if data of eight bits is added in correspondence to only the maximum amount within the distance L.

Although the flowing direction has been also set to a direction which is parallel with one edge of the image in the second embodiment, it may be also set to an oblique direction. In this case, the edge portions of the image plane in the direction opposite to the flowing direction exist at two positions; however processing similar to the above can be carried out.

Although an example of the flowing process has been described in the first and second embodiments, the present invention can be also applied to other flowing processes such as zooming process during exposure and the like. In the case of the zooming process during exposure, the image will flow radially; therefore, it is sufficient to execute the flowing process with respect to each flowing direction. In addition, although an example whereby only a part of the image plane flows has been described, the invention can be also applied to the case where the whole image plane flows.

As described above in the present invention, when no image information to be shifted to the predetermined position exists, image information at another position in the image plane is shifted to the predetermined position. Thus, the flowing process without any sense of incompatibility can be realized without cutting a part of the image plane.

The present invention is not limited to the foregoing embodiments but many modifications and variations are possible within the spirit and scope of the appended claims of the invention.

What we claim is:

1. A still image processing method for producing one still blurred image signal representing one still blurred image comprising the steps of:
   providing a first original still image signal representing an original still image of one image plane;
   shifting in a predetermined direction the first original still image signal;
   adding the shifted still image signal to the first original still image signal, to produce a second still image signal; and forming one still blurred image signal representing a one still blurred image by repeating said shifting step and said adding step, the still blurred image by itself showing a visual flowing effect.

2. A method according to claim 1, further comprising the step of inhibiting execution of at least one of said shifting step and said adding step for a part of an area of the original still image represented by the first original still image signal.

3. A method according to claim 2, further comprising the step of designating the part of the area of the original still image for which execution of at least one of said shifting step and said adding step is inhibited.

4. A method according to claim 1, further comprising the step of designating a shifting direction in which the shifting of said shifting step is to be performed.

5. A method according to claim 1, wherein in said shifting step, when the shifting according to regular operation of said shifting step results in a shifted still image signal representing a shifted still image lacking a portion corresponding to the original still image, a portion of said first original still image signal is added to said shifted still image signal so that the shifted still image signal represents a shifted still image having the portion corresponding to the original still image.

6. A method according to claim 5, wherein said shifting step shifts the first original still image signal by a predetermined amount so that said shifted still image signal represents a shifted still image shifted by a predetermined amount as compared to the original still image, wherein the portion of the first original still image signal that is added to said shifted still image signal represents the image between an edge of the original still image and the portion of the original still image that is spaced from the edge thereof by the predetermined amount.

7. A method according to claim 5, wherein the step of adding of the portion of the original still image signal to the shifted still image signal corresponds to shifting a portion of the original still image in a direction opposite to the predetermined direction to the portion of the shifted still image lacking a correspondence to the original still image.

8. An image processing apparatus comprising:
   storage means for storing a first original still image signal representing an original still image of one image plane;
   shift means for shifting in a shift direction the still image signal stored in said storage means;
   addition means for adding the still image signal shifted by said shift means, to the first original still image signal, to produce a second still image signal; and
   output means for repeating operations of said shift means and said addition means to generate an image signal representing one still blurred image which by itself shows a visual flowing effect.

9. An apparatus according to claim 8, further comprising second storage means for storing an image signal obtained by said addition means.

10. An apparatus according to claim 8, further comprising inhibition means for inhibiting the operation of at least one of said shift means and said addition means for a part of an area of the still image represented by the still image signal.

11. An apparatus according to claim 10, further comprising area designation means for designating the part of the area of the still image represented by the still image signal.

12. An apparatus according to claim 8, further comprising direction designation means for designating the shift direction of said shift means.

13. An apparatus according to claim 8, wherein when said shifting means shifts the still image signal according to regular operation of said shifting means, to produce a shifted still image signal representing a shifted still image lacking a portion corresponding to the original still image, wherein a portion of said first original still image signal is added to said shifted still image signal so that the shifted still image signal represents a shifted still image having the portion corresponding to the original still image.

14. An apparatus according to claim 13, wherein said shifting step shifts the first original still image signal by a predetermined amount so that said shifted still image signal represents a shifted still image shifted by a predetermined amount as compared to the original still image, wherein the portion of the first original still image signal that is added to said shifted still image signal represents the image between an edge of the original still image and the portion of the original still image that is spaced from the edge thereof by the predetermined amount.

15. An apparatus according to claim 13, wherein the step of adding of the portion of the original still image signal to the shifted still image signal corresponds to shifting a portion of the original still image in a direction opposite to the predetermined direction to the portion of the shifted still image lacking a correspondence to the original still image.

* * * * *

UNITED STATES PATENT AND TRADEMARK OFFICE
CERTIFICATE OF CORRECTION

PATENT NO. : 5,125,041
DATED : June 23, 1992
INVENTOR(S) : HIROYUKI KIMURA, ET AL.

Page 1 of 3

It is certified that error appears in the above-identified patent and that said Letters Patent is hereby corrected as shown below:

SHEET 1 OF 6

Insert FIG. 1 and FIG. 2 as shown below in place of Sheet 1:

FIG. 1

FIG. 2

UNITED STATES PATENT AND TRADEMARK OFFICE
CERTIFICATE OF CORRECTION

PATENT NO. : 5,125,041
DATED : June 23, 1992
INVENTOR(S) : HIROYUKI KIMURA, ET AL.

It is certified that error appears in the above-identified patent and that said Letters Patent is hereby corrected as shown below:

COLUMN 2

Line 53, "step Si," should read --step S1,--.
Line 64, "store" should read --stored--.

COLUMN 3

Line 16, ""1"(S8)." should read --"0" (S8).--.
Line 27, "be made" should read --been made--.
Line 54, "steps S9 to S18" should read --steps S9 to S13--.

COLUMN 4

Line 11, "ar" should read --are--.
Line 39, "herein below" should read --hereinbelow--.
Line 59, "bit I" should read --bit 1--.

COLUMN 5

Line 9, "work memory (I)" should read --work memory (1)--.
Line 34, "direction" (1st occur.) should read --areas E'2 and F2 is derived by shifting the image in the direction--.
Line 35, "First," should read --¶ First,--.

UNITED STATES PATENT AND TRADEMARK OFFICE
CERTIFICATE OF CORRECTION

PATENT NO. : 5,125,041
DATED : June 23, 1992
INVENTOR(S) : HIROYUKI KIMURA, ET AL.

It is certified that error appears in the above-identified patent and that said Letters Patent is hereby corrected as shown below:

<u>COLUMN 6</u>

Line 2, "int eh" should read --in the--.

Signed and Sealed this

Twenty-first Day of September, 1993

Attest:

BRUCE LEHMAN

Attesting Officer

Commissioner of Patents and Trademarks